US012649386B2

(12) United States Patent
Lee et al.

(10) Patent No.: US 12,649,386 B2
(45) Date of Patent: Jun. 9, 2026

(54) BATTERY COOLING DEVICE FOR VEHICLE

(71) Applicants: Hyundai Motor Company, Seoul (KR); Kia Corporation, Seoul (KR)

(72) Inventors: Gun Goo Lee, Suwon (KR); Jong Gu Lee, Seoul (KR); In Gook Son, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 814 days.

(21) Appl. No.: 17/994,771

(22) Filed: Nov. 28, 2022

(65) Prior Publication Data

US 2023/0415610 A1     Dec. 28, 2023

(30) Foreign Application Priority Data

Jun. 23, 2022     (KR) ........................ 10-2022-0076517

(51) Int. Cl.
H01M 10/613 (2014.01)
B60L 58/26 (2019.01)
H01M 10/625 (2014.01)

(52) U.S. Cl.
CPC ........... B60L 58/26 (2019.02); H01M 10/613 (2015.04); H01M 10/625 (2015.04)

(58) Field of Classification Search
CPC ... B60L 58/26; H01M 10/613; H01M 10/625; H01M 2220/20; H01M 10/6556; H01M 10/617; H01M 10/653; H01M 10/655; H01M 10/6568; H01M 50/249; H01M 50/271; Y02E 60/10
See application file for complete search history.

(56) References Cited

U.S. PATENT DOCUMENTS

| | | | | |
|---|---|---|---|---|
| 2014/0023906 A1* | 1/2014 | Hashimoto | ......... | H01M 10/625 |
| | | | | 429/157 |
| 2016/0087319 A1* | 3/2016 | Roh | ................. | H01M 10/6551 |
| | | | | 429/62 |
| 2017/0263985 A1 | 9/2017 | Nishikawa et al. | | |
| 2019/0006725 A1* | 1/2019 | Nam | ................. | H01M 10/6554 |
| 2019/0123405 A1* | 4/2019 | Jeon | ................... | H01M 10/625 |
| 2020/0006825 A1* | 1/2020 | Lee | ...................... | H01M 50/271 |
| 2022/0316818 A1* | 10/2022 | Fröhlich | ................... | F28F 3/12 |

FOREIGN PATENT DOCUMENTS

| | | |
|---|---|---|
| EP | 3540847 A1 | 9/2019 |
| EP | 3660975 A1 | 6/2020 |
| KR | 10-2019-0044180 A | 4/2019 |
| KR | 102020003 B1 | 9/2019 |
| KR | 10-2020-0066832 A | 6/2020 |
| KR | 10-2021-0127413 A | 10/2021 |
| KR | 102324507 B1 | 11/2021 |
| WO | 2020102496 A1 | 5/2020 |

* cited by examiner

*Primary Examiner* — Muhammad S Siddiquee
(74) *Attorney, Agent, or Firm* — Fox Rothschild LLP

(57) ABSTRACT

A battery cooling device for a vehicle is provided. The battery cooling device includes a plurality of battery casings accommodating a plurality of battery cells therein, a gap filler applied to each of upper and lower surfaces in the battery casing to transfer heat generated from the battery cell, and a cooling channel disposed in each of upper and lower portions of the battery casing, and performing exchange of heat for the battery cell transferred by the gap filler.

16 Claims, 6 Drawing Sheets

BATTERY COOLING DEVICE FOR VEHICLE

CROSS REFERENCE TO RELATED APPLICATION

The present application claims under 35 U.S.C. § 119(a) the benefit of Korean Patent Application No. 10-2022-0076517, filed Jun. 23, 2022, the entire contents of which are incorporated herein for all purposes by this reference.

BACKGROUND OF THE DISCLOSURE

Technical Field

The present disclosure relates to a battery cooling device for a vehicle. More particularly, the present disclosure relates to a battery cooling device for a vehicle, which can prevent the durability performance and output performance of a battery from being deteriorated, by rapidly lowering the temperature of a battery cell, which is raised due to an increase in quick charging current, using a cooling channel.

Background

Recently, a secondary battery capable of charging/discharging is widely used as an energy source for a wireless mobile device.

In addition, the secondary battery is being spotlighted as a power source for an electric vehicle (EV) or a hybrid electric vehicle (HEV), which is proposed as measures for solving air pollution caused by an existing gasoline vehicle or diesel vehicle using fossil fuel.

Generally, the electric vehicle is designed to run on the principle of rotating an electric motor using electric energy and thereby driving wheels. For the driving, high-voltage battery energy is essentially required.

Therefore, because a medium- or large-sized device such as an automobile requires a high output and large capacity, a battery module in which a plurality of battery cells is electrically connected and a medium or large battery pack including the battery module as a unit module are being used.

Since the battery module and the battery pack are preferably manufactured as small as possible in size and weight, they may be stacked at a high density, and a prismatic battery or a pouch-type battery having a small weight compared to capacity is mainly used as a unit battery of the battery module.

In particular, the pouch-type battery using an aluminum laminate sheet or the like as an exterior member is advantageous in that it is small in weight, low in manufacturing cost, and easily changed in shape, thus drawing keen attention.

However, since the battery cell forming the battery module generates a large amount of heat in a charging/discharging process, a path for refrigerant such as coolant is formed between the stacked battery cells or battery modules to effectively remove accumulated heat.

As such, the conventional battery pack has developed to properly dissipate heat generated by the use of the battery cell and thereby maintain its performance and lifespan. However, recently, as the quick charging time is shortened and the energy capacity of the battery cell is increased, heat generated from the battery cell is increased by the square of current applied to the battery cell multiplied by an internal resistance value. If heat generated from the battery cell increases, there is a large temperature difference between the lower portion and the upper portion of the battery cell due to the limitation of the thermal conductivity of the battery cell itself, thus resulting in the deterioration of the durability of the battery.

SUMMARY OF THE DISCLOSURE

Accordingly, the present disclosure has been made keeping in mind the above problems occurring in the related art, and an objective of the present disclosure is to provide a battery cooling device for a vehicle, in which cooling channels are formed, respectively, in upper and lower portions of a battery cell, thus reducing a temperature difference between the upper and lower portions of the battery cell, and a gap filler is applied between the battery cell and each of the upper and lower cooling channels to directly transfer heat generated from the battery cell to the cooling channel, thus allowing the temperature of the battery cell raised due to an increase in quick charging current to be rapidly lowered, and thereby preventing the durability performance and output performance of a battery from being deteriorated.

In order to achieve the objective of the present disclosure, the present disclosure provides a battery cooling device for a vehicle, the battery cooling device including a plurality of battery casings configured to accommodate a plurality of battery cells therein, a gap filler applied to each of upper and lower surfaces in the battery casing to transfer heat generated from the battery cell, and a cooling channel disposed in each of upper and lower portions of the battery casing, and performing exchange of heat for the battery cell transferred by the gap filler.

The cooling channel may include an upper cooling channel disposed in the upper portion of the battery casing, and formed such that cooling fluid introduced into an inlet flows along a plurality of cooling paths and then is discharged to an outlet, and a lower cooling channel disposed in the lower portion of the battery casing, and formed such that the cooling fluid introduced into the inlet flows along the plurality of cooling paths and then is discharged to the outlet.

The cooling channel may be formed such that cooling paths formed in the upper cooling channel and the lower cooling channel have different courses.

The cooling channel may be branched from one inlet to cause the cooling fluid to flow into the upper cooling channel and the lower cooling channel, and cooling fluids discharged from the upper cooling channel and the lower cooling channel may be connected to each other and then are discharged to one outlet.

The flow directions of the cooling fluids circulating through the upper cooling channel and the lower cooling channel may be opposite to each other.

The cooling channel may be integrally formed in the upper and lower portions of the battery casing.

The battery casing may be formed to be separated into a first casing and a second casing.

The first casing may be assembled to close an open top of the second casing in a state where the battery module and the gap filler are disposed in the second casing, thereby forming the battery casing.

In another embodiment, vehicles are provided that comprise an apparatus as disclosed herein.

The present disclosure is advantageous in that a cooling channel is formed in each of upper and lower portions of a battery cell to solve a problem in which durability performance is reduced when a large temperature difference occurs between the upper and lower portions of the battery cell due to the limitation of the thermal conductivity of the battery cell itself, as heat generated from the battery cell increases, thus reducing the temperature difference between the upper and lower portions of the battery cell.

Further, the present disclosure is advantageous in that a gap filler is applied between a battery cell and each of upper and lower cooling channels to directly transfer heat generated from the battery cell to the cooling channel, thus allowing the temperature of the battery cell raised due to an increase in quick charging current to be rapidly lowered.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Hereinafter, preferred embodiments of the present disclosure will be described in detail with reference to the accompanying drawings.

The advantages, features, and effects of the present disclosure will be more clearly understood from the following detailed description with reference to the accompanying drawings.

The present disclosure may be embodied in many different forms and should not be construed as being limited to only the embodiments set forth herein. Embodiments of the present disclosure will be provided to enable those skilled in the art more fully understand the present disclosure.

Further, when it is determined that the detailed description of the known art related to the present disclosure may obscure the gist of the present disclosure, the detailed description will be omitted.

Figure 1:
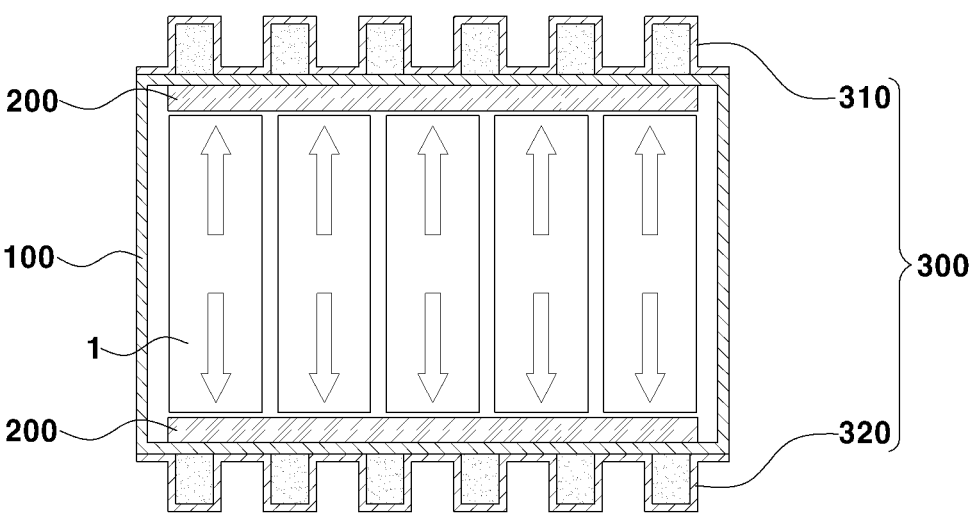
FIG. 1 is a diagram illustrating a battery cooling device for a vehicle according to an exemplary embodiment of the present disclosure.
Figure 2:
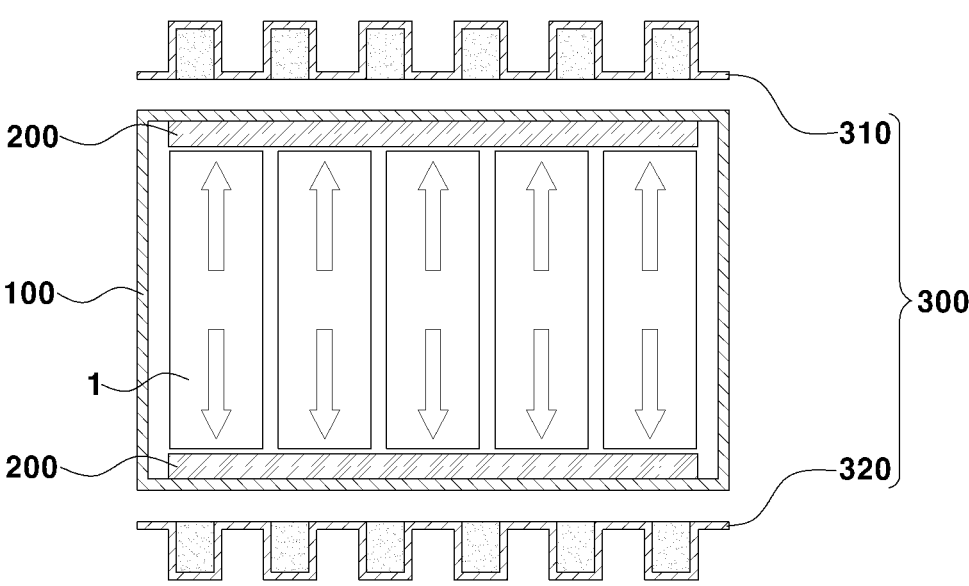
FIG. 2 is a diagram illustrating the configuration of the battery cooling device for the vehicle according to an exemplary embodiment of the present disclosure.
Figure 3:
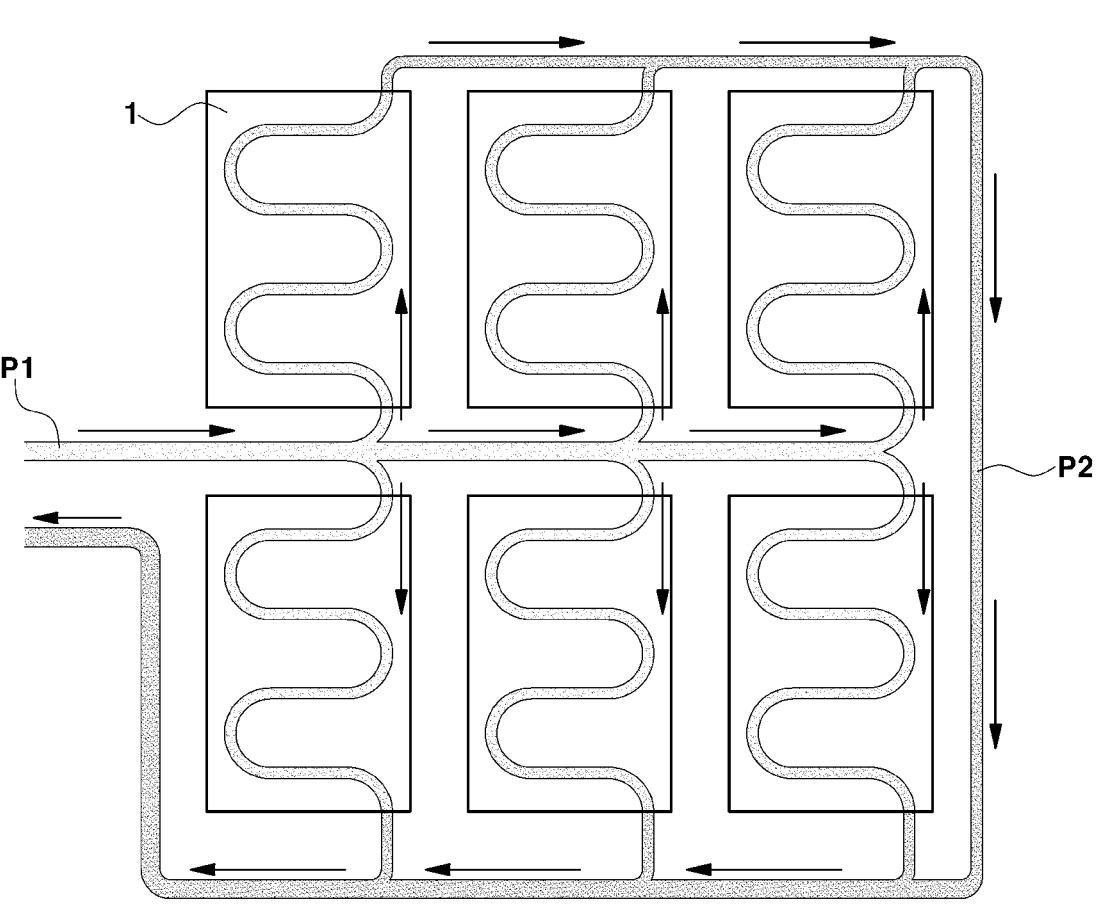
FIG. 3 is a diagram illustrating a cooling channel disposed in a lower portion of a battery casing in the battery cooling device for the vehicle according to an exemplary embodiment of the present disclosure.

FIG. 1 is a diagram illustrating a battery cooling device for a vehicle according to an exemplary embodiment of the present disclosure, FIG. 2 is a diagram illustrating the configuration of the battery cooling device for the vehicle according to an exemplary embodiment of the present disclosure, and FIG. 3 is a diagram illustrating a cooling channel disposed in a lower portion of a battery casing in the battery cooling device for the vehicle according to an exemplary embodiment of the present disclosure.

Figure 4:
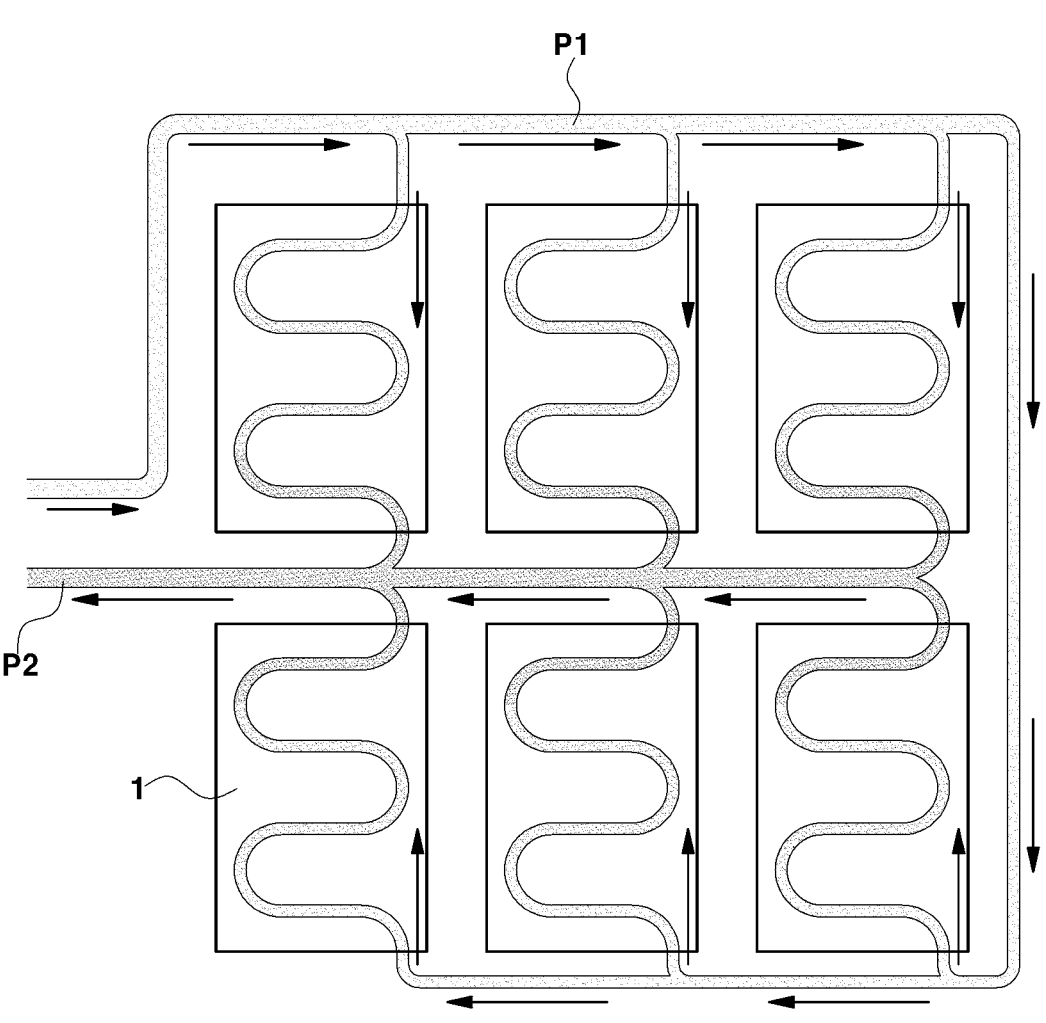
FIG. 4 is a diagram illustrating a cooling channel disposed in an upper portion of the battery casing in the battery cooling device for the vehicle according to an exemplary embodiment of the present disclosure.
Figure 5:
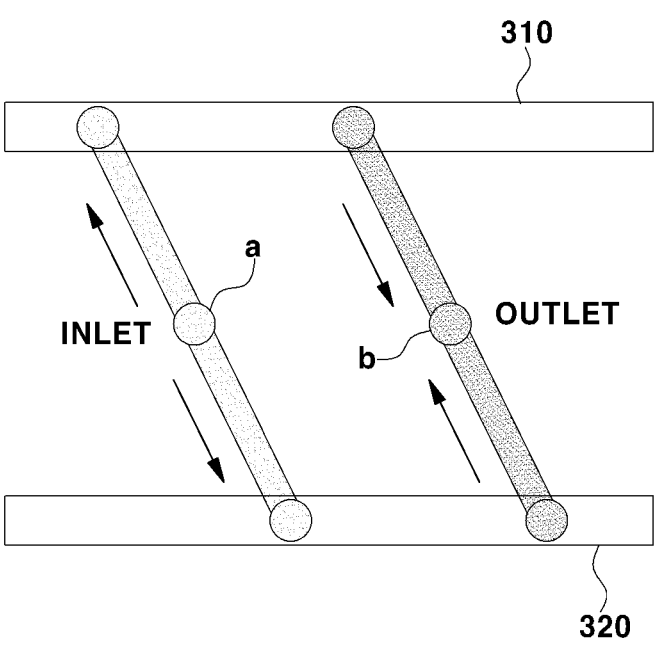
FIG. 5 is a diagram illustrating an inlet and an outlet of the cooling channel in the battery cooling device for the vehicle according to an exemplary embodiment of the present disclosure.
Figure 6:
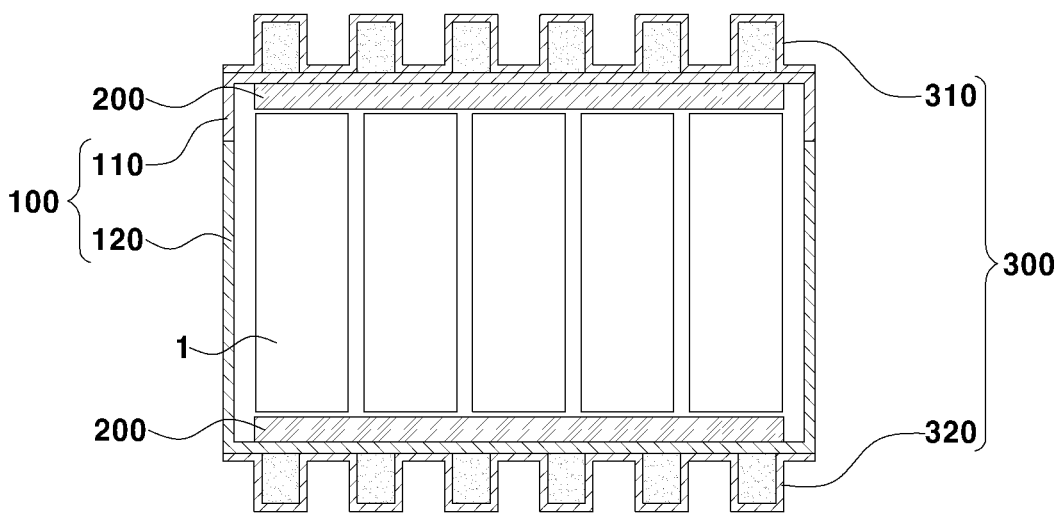
FIG. 6 is a diagram illustrating the assembly of the battery casing in the battery cooling device for the vehicle according to an exemplary embodiment of the present disclosure.

Further, FIG. 4 is a diagram illustrating a cooling channel disposed in an upper portion of the battery casing in the battery cooling device for the vehicle according to an exemplary embodiment of the present disclosure, FIG. 5 is a diagram illustrating an inlet and an outlet of the cooling channel in the battery cooling device for the vehicle according to an exemplary embodiment of the present disclosure, and FIG. 6 is a diagram illustrating the assembly of the battery casing in the battery cooling device for the vehicle according to an exemplary embodiment of the present disclosure.

Generally, a battery module is manufactured by stacking a plurality of battery cells at high density, and the battery cells forming the battery module usually generate a large amount of heat during a charging or discharging process.

If the heat of the battery module generated during the charging or discharging process is not effectively removed, the heat is accumulated. As a result, this may accelerate the deterioration of the battery module, and may cause fire or explosion in some cases.

Therefore, a high-output and large-capacity battery module in which the plurality of battery cells is stacked and a battery casing in which the battery module is mounted may require a cooling member for cooling the battery cells.

To this end, as shown in FIG. 1, a battery cooling device for a vehicle according to this embodiment may include a battery casing 100, a gap filler 200, and a cooling channel 300.

The battery casing 100 may be formed to accommodate a plurality of battery modules 1 that are made by stacking a plurality of battery cells.

As shown in FIG. 6, the battery casing 100 may be formed to be separated into a first casing 110 at an upper position and a second casing 120 at a lower position. The first casing 110 may be selectively coupled to or separated from the second casing 120.

Further, the gap filler 200 may be applied to be in contact with each of the upper and lower portions of the battery module 1, and serve to transfer heat generated from the battery module 1 to the upper and lower portions of the battery casing 100, as shown by the arrows of FIG. 2.

The cooling channel 300 may be disposed on the upper and lower portions of the battery casing 100 to face the gap filler 200, and may be formed so that cooling fluid flows along an internal cooling path.

Thus, if heat generated from the battery module 1 is transferred to the cooling channel 300 by the gap filler 220, heat exchange may be performed using a flowing cooling fluid, so heat generated from the battery module 1 can be smoothly dissipated.

Here, the cooling channel 300 may include an upper cooling channel 310 and a lower cooling channel 320 to reduce a temperature difference between the upper and lower portions of the battery module 1.

That is, although not shown in the drawings, since the cooling channel is conventionally disposed only in the lower portion of the battery casing, heat generated from the battery cell may be dissipated along the path of the lower portion of the battery cell, the gap filler, the battery casing, and the lower cooling channel.

However, as quick charging time is shortened and the energy capacity of the battery cell is increased, heat generated in the battery cell may also be relatively increased. Therefore, due to the limitation of the thermal conductivity of the battery cell itself, a large difference in temperature between the upper and lower portions of the battery cell occurs, thereby deteriorating the durability of the battery.

In order to solve the problem, according to this embodiment, the upper cooling channel 310 and the lower cooling channel 320 may be disposed in the upper and lower portions of the battery casing 100, respectively. This can effectively dissipate heat generated from the battery module 1 made by stacking the battery cells during quick charging, thus improving cooling performance and durability as compared to the conventional structure.

Preferably, the upper cooling channel 310 and the lower cooling channel 320 may be formed such that their cooling paths have different courses. Specifically, the flow directions of cooling fluid circulating through the upper cooling channel 310 and the lower cooling channel 320 may be opposite to each other.

More preferably, in the upper cooling channel 310, a cooling path P1 may be formed along the upper edge of the battery casing 100 as shown in FIG. 4, so the cooling fluid flows to a central portion of an upper portion of the battery casing 100 (Cf the direction shown by the arrows). In addition, in the lower cooling channel 320, a cooling path P1 is formed along a central portion of a lower portion of the battery casing 100 as shown in FIG. 3, so the cooling fluid flows to the lower edge of the battery casing 100 (Cf the direction shown by the arrows).

This is intended to minimize a temperature distribution difference between the plurality of battery modules 1, and will be described in detail with reference to FIGS. 3 and 4.

First, in the lower cooling channel 320, the cooling path P1 may be formed along the central portion of the lower portion of the battery casing 100, so the cooling fluid flows to each battery module 1, and the cooling fluid undergoing heat exchange flow along a path P2 of the lower edge of the battery casing 100 to be discharged to an outlet. Thus, the inside temperature of the plurality of battery modules 1 becomes rapidly lower than the edge temperature due to the cooling fluid fed from the inlet (see FIG. 3).

In contrast, in the upper cooling channel 310, the cooling path P1 may be formed along the upper edge of the battery casing 100, so the cooling fluid flows to each battery module 1, and the cooling fluid undergoing heat exchange flow along the path P2 of the central portion of the upper portion of the battery casing 100 to be discharged to the outlet. Thus, the edge temperature of the plurality of battery modules 1 becomes rapidly lower than the inside temperature due to the cooling fluid fed from the inlet (see FIG. 4).

Therefore, as described above, the cooling paths P1 and P2 formed in the upper cooling channel 310 and the lower cooling channel 320 may be formed to have different courses, thus minimizing the temperature distribution difference between the plurality of battery modules 1. As a result, it is possible to quickly dissipate heat from the entire battery module 1, and to prevent problems in which the durability of the battery is deteriorated due to an increase in quick charging current and output is deteriorated due to the high temperature of the battery after charging.

Further, inlets and outlets for introducing and discharging the cooling fluid may not be formed separately in the upper cooling channel 310 and the lower cooling channel 320 of the cooling channel 300, but the inlets and the outlets are formed to be integrally connected as shown in FIG. 5.

In other words, the cooling channel 300 may be branched into upper and lower portions from one inlet a to cause cooling fluid to flow into the upper cooling channel 310 and the lower cooling channel 320, respectively. After cooling fluids flow along the cooling path, the cooling fluids discharged from the upper cooling channel 310 and the lower cooling channel 320 are connected to be integrated into each other, and then are discharged to one outlet b.

Thereby, it is possible to prevent a problem in which a structure connected to members for introducing and discharging the cooling fluid becomes complicated as the inlets and the outlets are separately formed in the upper cooling channel 310 and the lower cooling channel 320. Since the battery itself has a compact structure, it can be relatively easy to mount the battery.

Meanwhile, as shown in FIG. 6, the battery casing 100 may be formed to be separated into a first casing 110 at an upper position and a second casing 120 at a lower position.

Here, in a state where the battery module 1 is disposed in the second casing 120 and the gap filler 200 is applied to face each of the upper and lower portions of the battery module 1, the first casing 110 may be assembled to close the open top of the second casing 120, thereby forming the battery casing 100.

That is, as the lower cooling channel 320 is integrally formed in the second casing 120 through welding or the like so that heat generated from the lower portion of the battery module 1 is transferred by the gap filler 200, the heat may be dissipated through heat exchange. According to this embodiment, since heat generated from the upper portion of the battery module 1 is also dissipated through the same structure, it is preferable that the upper cooling channel 310 is integrally formed in the first casing 110. Thus, the first casing 110 in which the upper cooling channel 310 is formed is coupled to the second casing 120 through an assembly method such as fitting, so the battery casing 100 may be easily completed.

Although not shown in the drawings, the process for completing the battery casing 100 will be sequentially described as follows.

First, the gap filler 200 may be applied to the second casing 120 in which the lower cooling channel 320 is integrally formed to face the lower cooling channel 320, and the battery module 1 formed by stacking the plurality of battery cells is disposed.

Next, the gap filler 200 may be applied to face the lower portion of the battery module 1. In this state, the first casing 110 is assembled such that the gap filler 200 and the upper cooling channel 310 face each other. As a result, it is possible to complete the battery casing 100 configured such that the gap fillers 200, the upper cooling channel 310, and the lower cooling channel 320 are disposed on the upper and lower portions of the battery module 1, that is, configured to rapidly dissipate the heat of the battery increased due to the increase in quick charging current.

The present disclosure is advantageous in that a cooling channel is formed in each of upper and lower portions of a battery cell to solve a problem in which durability performance is reduced when a large temperature difference occurs between the upper and lower portions of the battery cell due to the limitation of the thermal conductivity of the battery cell itself, as heat generated from the battery cell increases, thus reducing the temperature difference between the upper and lower portions of the battery cell.

Further, the present disclosure is advantageous in that a gap filler is applied between a battery cell and each of upper and lower cooling channels to directly transfer heat generated from the battery cell to the cooling channel, thus allowing the temperature of the battery cell raised due to an increase in quick charging current to be rapidly lowered.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A battery cooling device for a vehicle, the battery cooling device comprising:
   a plurality of battery casings configured to accommodate a plurality of battery cells therein;
   a gap filler applied to each of upper and lower surfaces in the battery casing to transfer heat generated from the battery cell; and
   a cooling channel disposed in each of upper and lower portions of the battery casing, and performing exchange of heat for the battery cell transferred by the gap filler;
   wherein the cooling channel comprises:
      an upper cooling channel disposed in the upper portion of the battery casing; and
      a lower cooling channel disposed in the lower portion of the battery casing; and wherein an inlet and an outlet of the upper cooling channel and an inlet and an outlet of the lower cooling channel are formed to be integrally connected.

2. The battery cooling device of claim 1, wherein the upper cooling channel is formed such that cooling fluid introduced into the inlet flows along a plurality of cooling paths and then is discharged to the outlet.

3. The battery cooling device of claim 2, wherein the lower cooling channel is formed such that the cooling fluid introduced into the inlet flows along the plurality of cooling paths and then is discharged to the outlet.

4. The battery cooling device of claim 3, wherein the cooling channel is formed such that cooling paths formed in the upper cooling channel and the lower cooling channel have different courses.

5. The battery cooling device of claim 3, wherein the cooling channel is branched from one inlet to cause the cooling fluid to flow into the upper cooling channel and the lower cooling channel, and cooling fluids discharged from the upper cooling channel and the lower cooling channel are connected to each other and then are discharged to one outlet.

6. The battery cooling device of claim 5, wherein flow directions of the cooling fluids circulating through the upper cooling channel and the lower cooling channel are opposite to each other.

7. The battery cooling device of claim 6, wherein in the upper cooling channel, a cooling path is formed along a upper edge of the battery casing, so the cooling fluid flows to a central portion of the upper portion of the battery casing.

8. The battery cooling device of claim 7, wherein in the lower cooling channel, a cooling path is formed along a lower edge of the battery casing, so the cooling fluid flows to a central portion of the lower portion of the battery casing.

9. The battery cooling device of claim 1, wherein the cooling channel is integrally formed in the upper and lower portions of the battery casing.

10. The battery cooling device of claim 1, wherein the battery casing is formed to be separated into a first casing and a second casing.

11. The battery cooling device of claim 10, wherein the first casing is assembled to close an open top of the second casing in a state where the battery cells and the gap filler are disposed in the second casing, thereby forming the battery casing.

12. The battery cooling device of claim 11, wherein the first casing is selectively coupled to or separated from the second casing.

13. The battery cooling device of claim 1, wherein the plurality of battery casings accommodate the plurality of battery cells.

14. The battery cooling device of claim 1, wherein the gap filler is in contact with each of the upper and lower surfaces in the battery casing.

15. The battery cooling device of claim 1, wherein the gap filler faces each of the upper and lower portions of the battery cells.

16. A vehicle comprising the battery cooling device of claim 1.

* * * * *